Oct. 26, 1965 R. A. DRATZ 3,213,793
MANUFACTURE OF CELLULOSIC PROPELLANT
Filed July 24, 1961 6 Sheets-Sheet 5
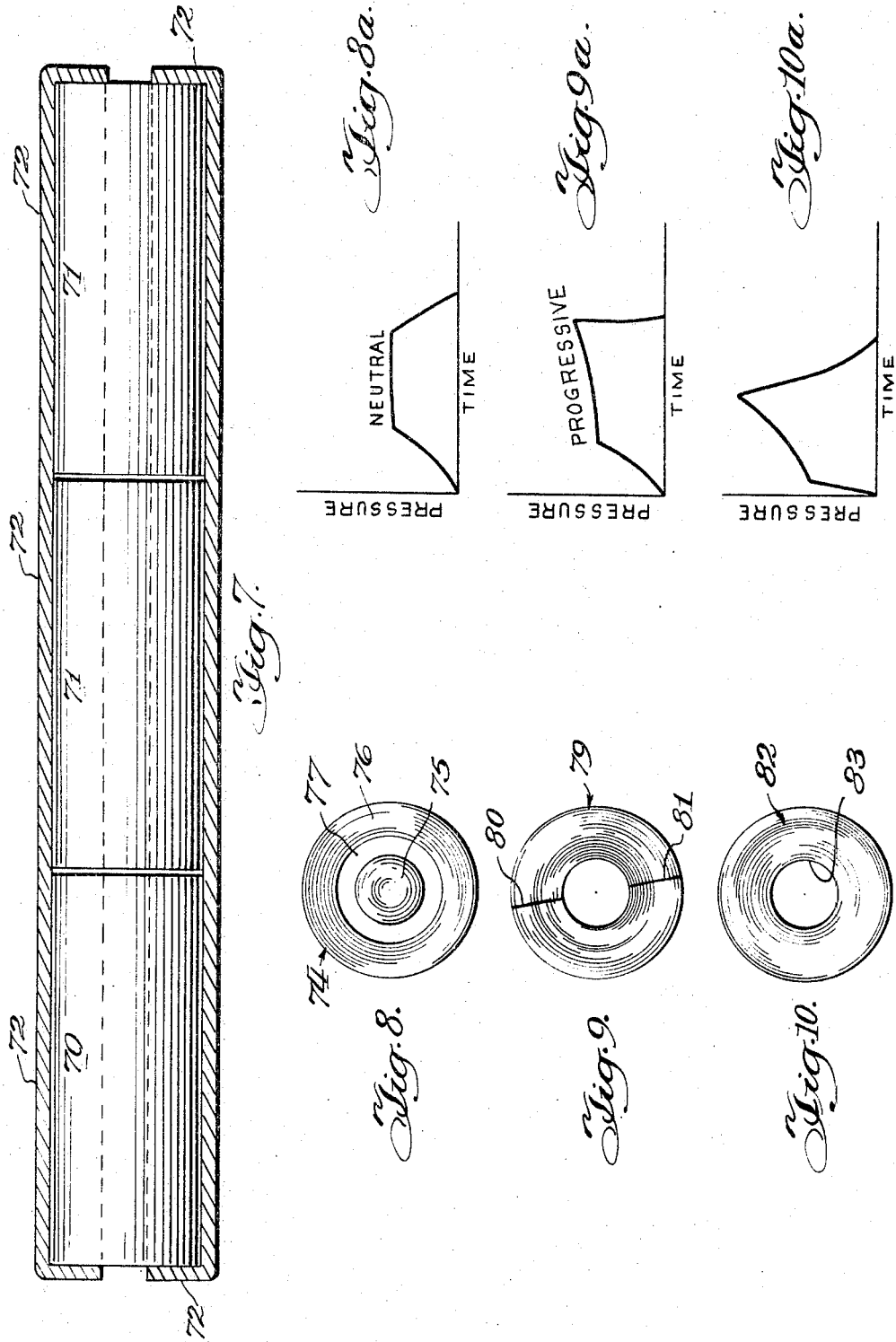

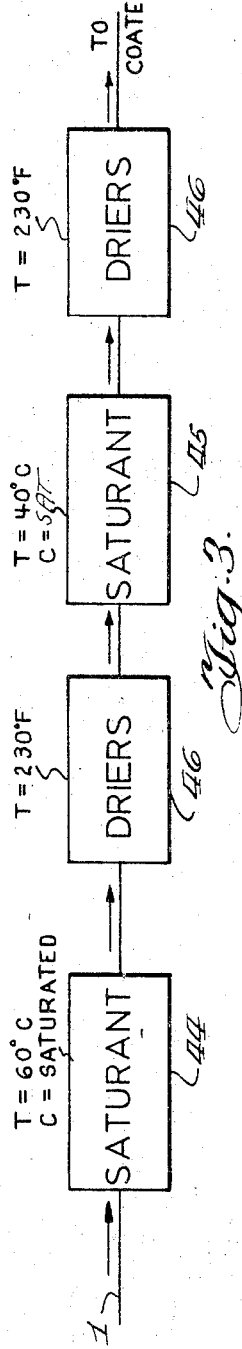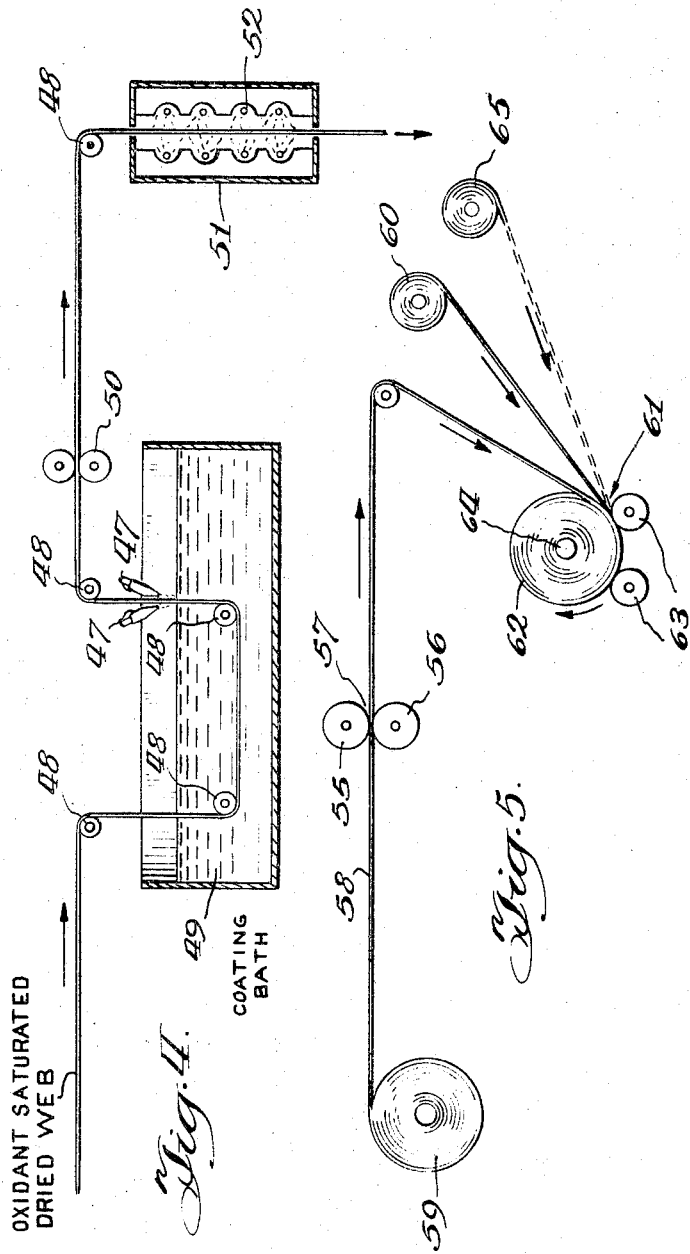

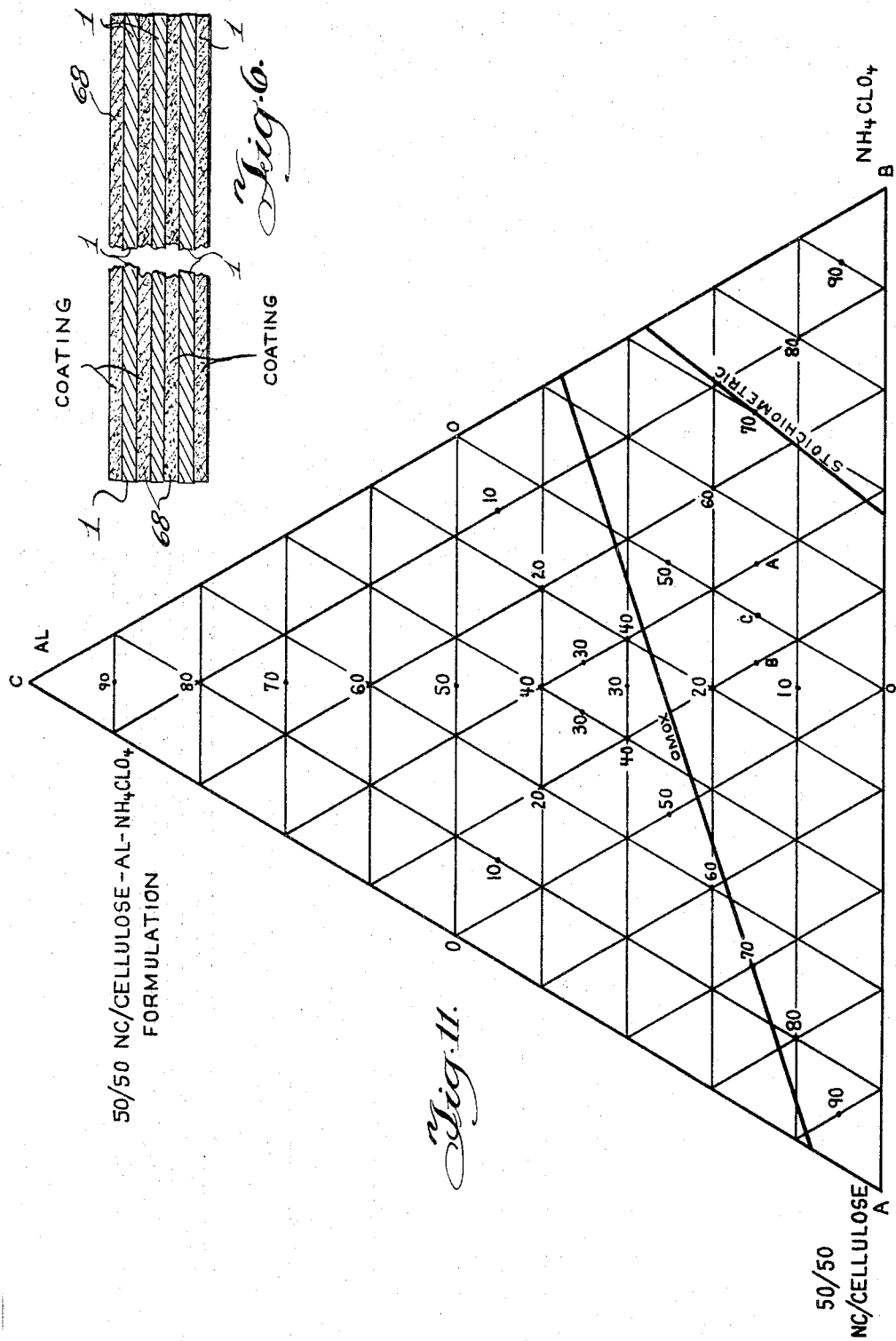

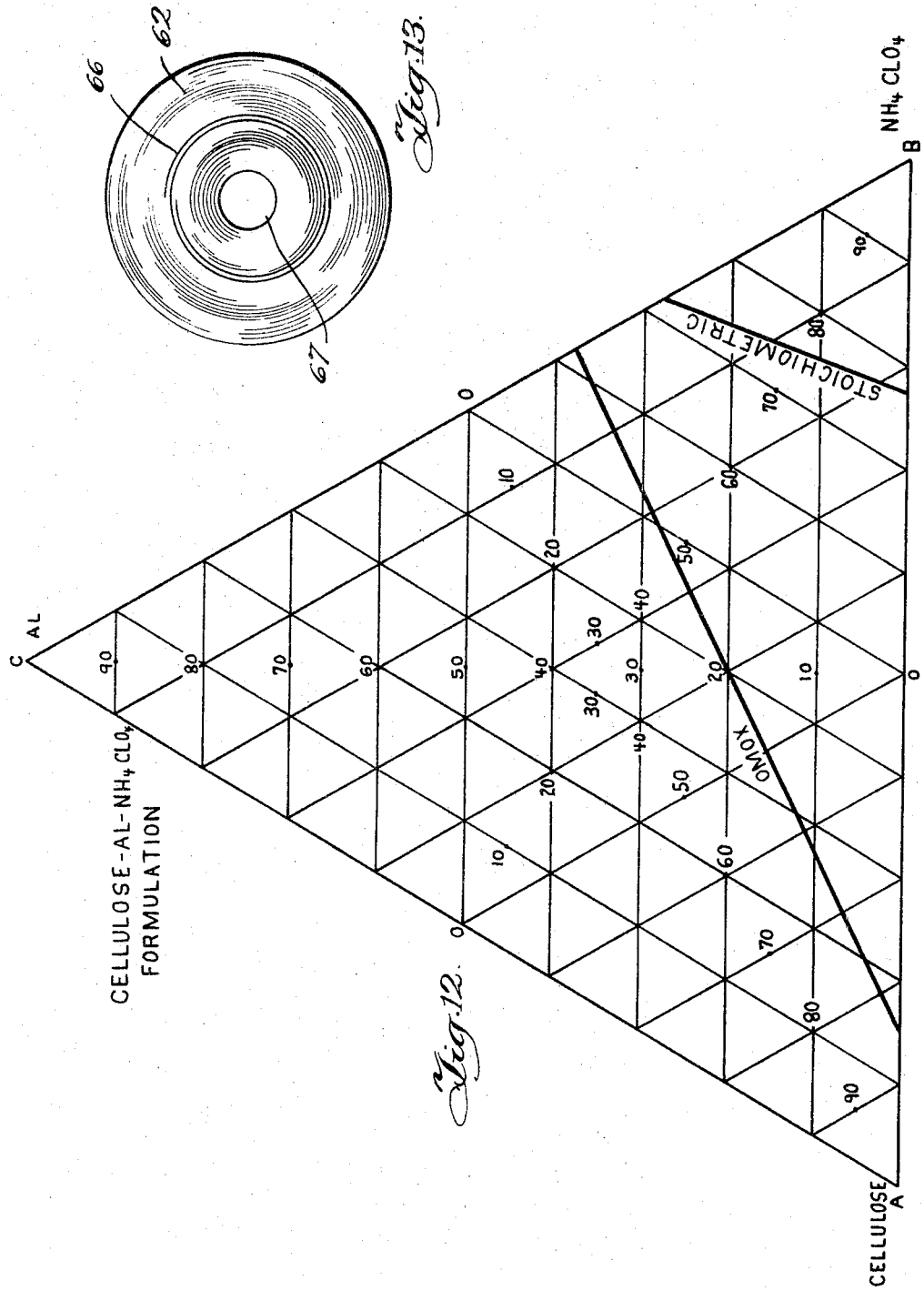

# 3,213,793
MANUFACTURE OF CELLULOSIC PROPELLANT

Richard A. Dratz, Appleton, Wis., assignor to Kimberly-Clark Corporation, Neenah, Wis., a corporation of Delaware
Filed July 24, 1961, Ser. No. 126,087
8 Claims. (Cl. 102—98)

This invention relates to solid propellants and, more specifically, to the production of a solid rocket propellant of large size, and novel form and composition, in which a substantially continuous, spirally wound web of combustible material serves as a carrier for more reactive fuel-oxidant combinations.

Heretofore, processes utilized for the formation of solid propellants have involved principally casting, molding, and extruding procedures including generally relatively long curing periods for the materials of the propellant. Such methods are of considerable disadvantage as the operations are essentially discontinuous, time-consuming, and consequently expensive. As the size of the propellant increases, these disadvantages become more pronounced.

This invention is concerned particularly with the production on a substantially continuous basis of a composition which is well suited for rocket propellants. Accordingly, the invention has as one primary object the overcoming of the disadvantages noted hereinbefore, and the provision of an economical procedure for mass production of solid propellants; particularly, the invention is directed to solid propellant charges of very large size, that is, that which may be on the order of hundreds of tons.

A further object of the invention is to produce solid propellant material by a method which is characterized by safety considerations during processing without sacrifice of specific impulse and other characteristics commonly desired in solid propellants and while yet employing talents, and in large measure, equipment already available to a well-established industry.

Another object of the invention is to describe a novel laminated product having utility as a solid rocket propellant.

A particular object of the invention is to provide a rocket propellant charge or grain in the form of a substantially continuous spirally wound web and in which propellant charge the ratio of length to diameter as well as the internal cavity may be readily selected and controlled.

In accordance with the invention, an oxidant and fuel dispersed as in a coating color are applied as a coating to a cellulosic web which has itself been impregnated with an oxidizing agent; such coated web is then dried, densified, and rolled up, so that the roll itself may serve as a solid propellant charge. Smaller charges may be formed by simple rewinding operations and/or by cutting to size when required.

The cellulosic web is present in relatively minor proportion by weight to the oxidizing agent which impregnates it and the coating applied to it. The web itself is a combustible component of the final product but is of less significance in this respect, of course, than the finely divided metal used as a primary fuel. It is particularly contemplated that the proportion of the cellulosic web by weight in the final product, while relatively minor, is nevertheless present in sufficient quantity and strength to serve as a carrier matrix for the components of the propellant and to permit mechanical handling through equipment such as commonly used paper converting equipment to thereby facilitate mass production of the product.

Most suitably, the web is highly absorptive. This permits the introduction of the oxidizing agent from a solution. Commonly, an aqueous solution is employed for impregnation since the inorganic oxidizing agents presently used in solid propellants are water soluble. Highly absorptive webs applicable for the purpose are known and are commonly available. Such webs are produced on the Fourdrinier papermaking machine at high speeds and, accordingly, web production is itself conducive to economy of manufacture. In general, the webs found most desirable for the purpose are those termed in the art as a low density sheet; such sheet is suitably formed from an aqueous suspension of relatively unrefined fibers and the sheet itself is subjected to a minimum of wet pressing before drying. The amount of wet pressing is customarily determined by the inherent tendency of the particular fibers that are used to bond to each other together with the degree of fiber bonding desired in the final sheet or web.

Fiber selection also has an influence on the bond achieved and the degree of absorptivity, and customarily the long fiber kraft pulps both bleached and unbleached treated with a higher concentration of caustic than normally employed in the alpha treatment process (pulp treated with caustic) exhibit adequate degrees of fiber to fiber bonding and are well suited for the purpose of this invention. Fiber to fiber bonding is important both in the wet state of the web and the dry state; the web must retain its form and strength in the wet condition in order to permit of repeated subjection to saturants and coatings.

Webs very suitable for the practice of the invention are formed from papermaking fibers and have physical properties such that they exhibit low bulk density, high wet strength and high absorptivity; such web includes those having a basis weight of between about 16–45 pounds per ream (17 inches x 22 inches x 500 sheets), a caliper in a range of about 10 to 20 mils per sheet, and a bulk density between about 0.2 and 0.4.

While cellulose webs are very suitable, other fibers may be incorporated in such webs, the general requirements being that the webs be relatively porous, adsorptive, combustible and useful as a carrier or matrix in such proportion to the whole charge as not to deleteriously affect charge basic characteristics.

The ultimate nature of the original web, of course, is determined by characteristics desired in the final product with relation to the quantity of impregnant and coating material and in view of the purposes for which the propellant is desired.

The oxidant solution employed for the impregnation of the cellulosic web suitably is selected from common water-soluble oxidizing agents, and the nature of the specific agent selected is determined by the specific end use of the propellant. More generally and where high specific impulse is desired, ammonium perchlorate is the preferred oxidizing agent. Such oxidizing agents are suitably provided as saturated solutions at convenient temperatures, that is, between about 20–70° C. for use in production operations. In general, it is only necessary to pass the web to be impregnated through a bath of the saturant and then to remove the excess in any convenient manner as by squeeze rolls. In some instances successive applications of the saturant may be effected with drying between stages and with the succeeding stages temperature controlled to inhibit redissolving of the crystalline oxidizing agent from the web. Paper industry methods for effecting application of the saturant are desirable as such procedures customarily involve relatively rapid drying, a factor which contributes to the development of more minute crystals of the oxidizing agent intimately engaged with the fibers of the web. Commonly, the web after final drying and prior to coating will have a proportion of oxidizing agent to web weight of between about 2 to 1–4 to 1.

The drying temperature to which the oxidant impregnated web is subjected should be well below the decomposition temperature of the oxidizing agent and should be sufficiently high to effect rapid drying; with the usual oxidants such as ammonium perchlorate and ammonium nitrate, drying temperatures such as those commonly employed on a paper machine are readily utilized.

The coating composition which is applied to the dried impregnated web is preferably either a solvent or a water emulsion system of nitrocellulose. Solvent coatings, such as those employing acetone or a combination of solvents such as ethyl acetate, toluene and ethanol, are suitable but require the recovery of the solvent for most economical operation. Emulsified solvent systems in which the continuous phase is aqueous are advantageous to utilize higher lacquer solids and for safety purposes.

The primary fuel, which is preferably a finely divided metal, and additional oxidants are suspended in the fluid coating. Commercially available atomized aluminum metal in fine powder form (200–400 mesh) serves the purpose well, both from the viewpoint of ease of handling in the coating composition stage as well as providing adequate fuel in the finished product to achieve specific impulses in high energy ranges.

The coating itself may be applied by conventional coating equipment such as roll coaters, pond coaters, reverse roll coaters, knife coaters, dip coaters, and the like. Also, the coating may either be applied to each side successively or to each side at the same time; also, superposed coats may be employed.

The coated, impregnated web passing from the coating machine is dried and then subjected to a densifying operation. This densification is preferably effected on a calender roll stack provided with steel rolls under considerable pressure. The densified product is then wound upon a collapsible mandrel of conventional construction to form a cylindrical roll much as paper rolls are ordinarily wound. If it is desired that there be blocking between layers of the rolled web, rollup may take place under considerable tension and, in addition, the coated web itself may be slightly heated as by the application of infrared heat just prior to rolling. Also, solvent application may be employed to effect tackiness with consequent blocking.

Propellant charges, in accordance with the invention, are readily removed from collapsible mandrels, the diameter of such a mandrel being chosen initially to provide the desired perforation or internal cavity diameter. Such diameter is therefore closely controllable, which is of importance to the control of combustion initiation. Once appropriately started, combustion proceeds radially from the internal outwardly to the charge periphery along the cavity length.

The invention will be more fully understood by reference to the following detailed description and illustrated drawings wherein:

FIG. 3 is a block diagram illustrating a modification of the equipment arrangement of FIG. 2 and particularly shows successive saturant baths;

FIG. 4 illustrates a simplified arrangement for effecting coating of both sides of the sheet at one time;

FIG. 5 illustrates an apparatus arrangement for production of a modified form of rocket propellant;

FIG. 6 is an enlarged and somewhat exaggerated cross-sectional view of the impregnated coated web in accordance with the invention;

FIG. 7 illustrates one arrangement of rocket propellant charge embodying the invention;

FIGS. 8 and 8a illustrate respectively one form of rocket propellant configuration with its associated pressure-time curve, the propellant structure being of the rod and tube type and readily attainable by the practice of the invention;

FIGS. 9 and 9a are views similar respectively to that of FIGS. 8 and 8a of another modification of rocket propellant;

FIGS. 10 and 10a are views similar to the immediately preceding views of yet another modification of rocket propellant;

FIG. 11 is a triangular diagram representing compositions of a ternary system of oxidizer-aluminum-50/50 nitrocellulose-cellulose in accordance with the invention;

FIG. 12 is a similar diagram representing compositions of a ternary system of oxidizer-aluminum-cellulose; and FIG. 13 is a sectional view of another modification of the structure of the invention.

Figure 1:
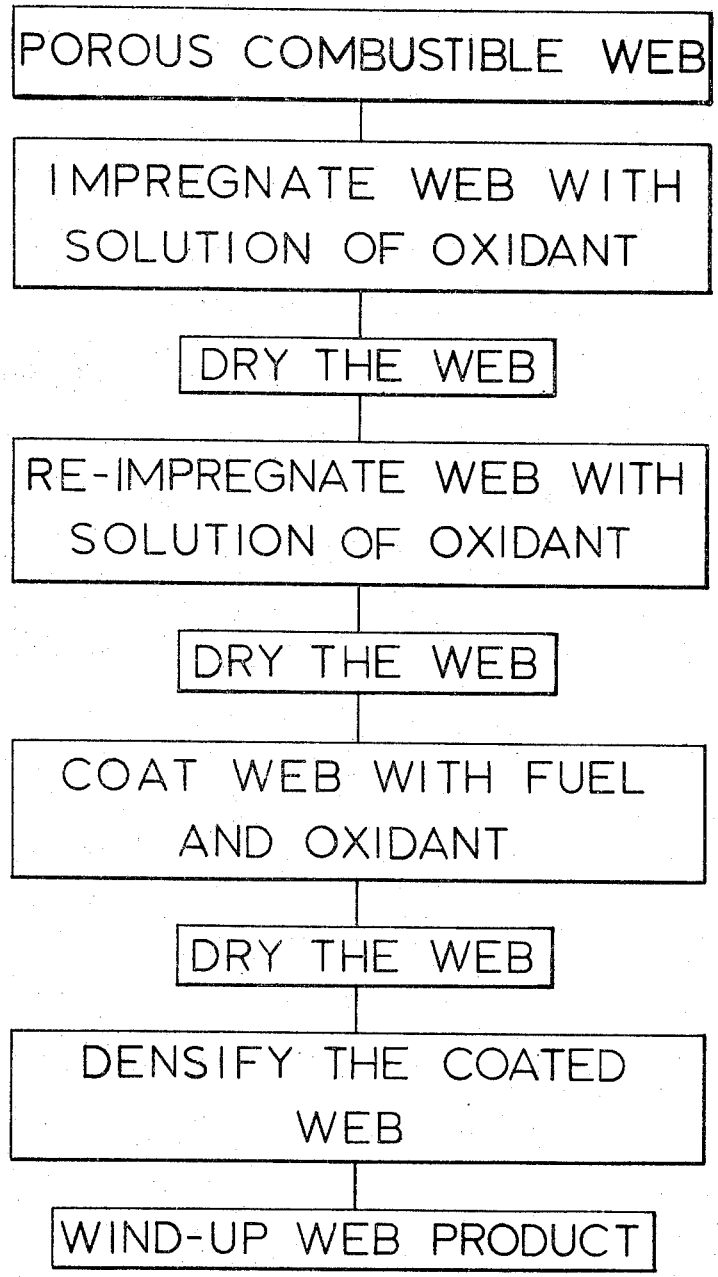
FIG. 1 is a flow chart illustrating steps in a preferred embodiment of the invention.
Figure 2:
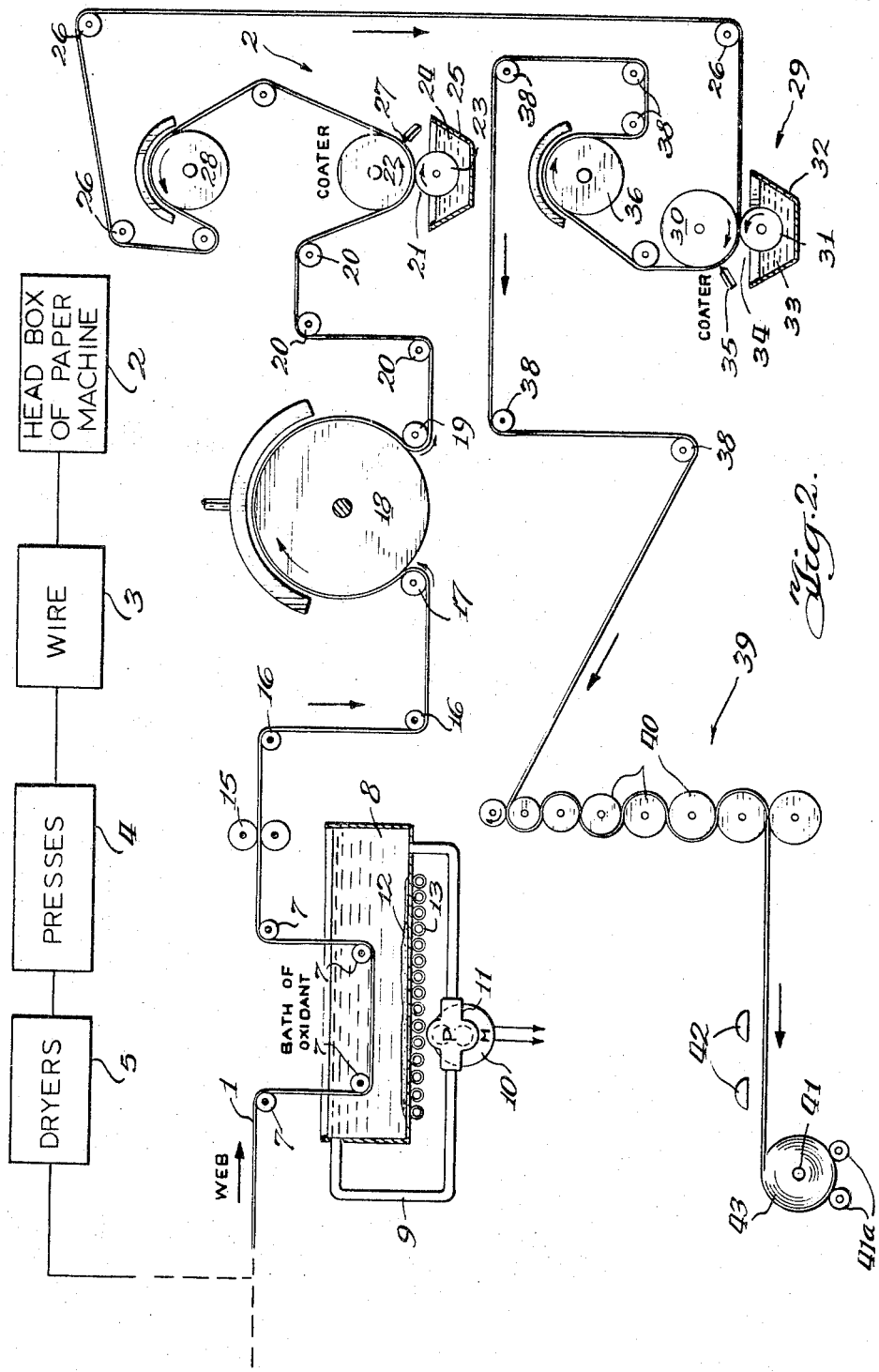
FIG. 2 is a schematic diagram of equipment useful in the practice of one embodiment of the invention showing a single oxidant impregnation or saturant bath.

Referring first to FIG. 2 and the schematic drawing of equipment suitable for the practice of the method of invention, as generally outlined in FIG. 1, the numeral 1 designates the cellulosic web.

This web 1 may have been previously formed on a papermaking machine and then subjected to the successive procedural steps illustrated in FIG. 2 to form the product of invention; or alternatively, the web may have been formulated on the papermaking machine having the usual papermaking machine components, that is, a head box 2, wire 3, presses 4 and driers 5. In the latter event the web is received from the driers 5 in substantially dry condition, that is, in equilibrium with the surrounding atmosphere and commonly containing about 4 or 6% moisture by weight. The presses 4, as already noted hereinbefore, may or may not be employed in the production of such a web depending upon the degree of porosity and density required in the web 1.

The web 1 is passed over suitable rollers 7 through the bath 8 which contains an aqueous solution of an oxidizing agent. The bath 8 is suitably provided with a circulatory system 9 including a motor 10 and pump 11 for continuously flowing saturant through the bath. Suitably also, an excess of the oxidizing agent indicated at 12 is provided within the bath to maintain the solution saturated at all times. Conventional heating coils 13 are provided to maintain adequate temperature of the bath; such heating may, of course, be effected and controlled in any convenient manner. From the bath 8 the web in saturated condition is passed to heated rolls 15 which engage and pressure the web and serve to remove excess fluid as well as to smooth the web; rolls 15 may be heated simply by continuous contact with the moving web or more suitably may be supplied with heat to maintain them at a temperature somewhat above that of the web. The excess fluid is suitably returned to the bath 8.

From the smoothing rolls 15 the web is directed over guide rolls 16 and pressure roll 17 to hooded drier 18. Drier 18 is simply a heated drum rotated in the direction indicated by the arrow by any convenient mechanism not shown. The web leaves the drier at outlet roll 19 and passes over guide rolls 20 to a nip 21 formed between a rotatable backing roll 22 and a coating applicator roll 23. Coating applicator roll 23 is partially immersed in the coating composition 24 retained in tank 25 and serves to pass coating composition to the nip 21. The pressure between the rolls 22–23 may be variable and suitably the backing roll 22 is rubber covered and, if desired, both rolls may be rubber covered. Preferably, the nip pressure is low and an excess quantity of coating material is applied to the web. The web passes on the backing roll upwardly with the excess coating thereon to blade 27 where the excess of material is removed and the coating on the web is smoothed and troweled. The web is then passed to hooded drier 28 with the uncoated side in contact with the drier roll. From drier 28 the web is passed over a plurality of idlers 26 to a second coater designated generally at 29 and which also includes backing roll 30, coating applicator roll 31, coating composition tank 32 and coating composition 33. The coating composition 33 is suitably of the same make-up as coating composition 24 and is applied to the second side of the web at the nip 34 by rotation of the roll 31 in the direction indicated by the arrows. From the coating device 29 the web is passed to blade 35, hooded drier 36, and thence over guide rolls 38 to a calender stack designated generally at 39. This calender stack is adapted to densify the dried coated web and accordingly consists of a plurality of hard-faced rolls 40 in pressured engagement; suitably, the rolls are simply of steel. From the calender stack 39 the coated densified web passes to wind-up device 41 which is suitably a collapsible mandrel associated with driving rollers 41a for effecting the wind-up rotation and roll 43 formation. If desired, the coating prior to application to the mandrel may be heated slightly as by means of infrared lamps 42. Such heating serves to soften the coating surface and to permit blocking of the layers as they are wound on the mandrel 41.

In the modification illustrated in the block diagram in FIG. 3 the uncoated web is successively exposed to saturant baths 44–45 between which there is interposed a drier or driers 46. The purpose of this arrangement is to increase the quantity of oxidizing agent achieved on the web prior to subjection of the web to the coating operation. In general, the dried web from the first saturant bath 44 in the case of ammonium perchlorate as the oxidizing agent will contain about 70% of the oxidizer and 30% of cellulose by weight. By the utilization of the second saturant bath 45 the oxidant may be readily increased to 79% by weight and the cellulose decreased accordingly to 21%. To effect this, in view of the tendency of the ammonium perchlorate to redissolve when this compound is the oxidant, the first bath as indicated on the drawing is operated at a temperature of about 60° C. while the second bath is operated at a temperature of about 40° C. Under these conditions the dried ammonium perchlorate crystals from the first saturating step are not redissolved by introduction to the second saturating step and, accordingly, the total saturant weight per increment of web is increased materially.

In FIG. 4 an alternative method of coating and drying is illustrated. In this instance the saturated web is passed over guide pulleys 48 through a coating composition bath 49 and then between air knives 47 to squeeze rolls 50. This arrangement is effective to coat both sides of the web at one time, the knives 47 being supported in any convenient manner, serving to remove excess coating. From the squeeze and smoothing rolls 50 the web is passed through a drying oven 51 between infrared lamp-banks 52. Oven 51 is suitably operated at a temperature of about 110° C.

The following specific examples taken in connection with the drawings and the foregoing specific description illustrate the practice of the invention.

*Example 1*

In this instance the product is intended to give a high impulse solid propellant composition. For this purpose a web having a basis weight of 25 pounds per ream (17 x 22 x 500 sheets) is formed on a paper machine at about 300 feet per minute from a cellulose fiber slurry and, as indicated in FIG. 2, is passed from the head box over the paper machine wire and to the driers but without utilization of the press section. The oxidant in the impregnating bath is a saturated solution (390.5 grams per liter of solution) of ammonium perchlorate maintained at a temperature of about 60° C. (140° F.). The web emanating from the bath is thoroughly wetted and is relieved of a small portion of the oxidant solution by the smoothing rolls as at 15 and is dried to about 5–10% moisture content by weight through the medium of a drier as at 18 (FIG. 2). This drier operates at a temperature of about 110° C. (230° F.). The dried web in this instance is resaturated (FIG. 3) with ammonium perchlorate solution at 40° C. (305.8 grams per liter of solution) and dried under the same drying conditions, i.e., at about 230° F. Such dried web contains by weight approximately 75% of ammonium perchlorate and 25% by weight of cellulose and, therefore, has a weight of 100 pounds per ream. Suitably, in practice the web is dried as thoroughly and quickly as possible before presentation to the coating apparatus; depending on ambient conditions the web at this stage of presentation to the coater is hot and contains 1–2% moisture based on the dry weight of the impregnated web.

The coating composition 24 is comprised of an aqueous emulsion having as a discontinuous phase ½ sec. nitrocellulose dissolved preferably in a mixture of relatively water-immiscible solvents. A small percentage of a suitable plasticizer is used such as dioctyl phthalate or dibutyl phthalate. The lacquer is emulsified with the aid of a non-ionic emulsifying agent such as a sorbitan monolaurate polyoxyalkylene derivative to provide good emulsion stability in the presence of dissolved salts. The continuous phase is aqueous and the emulsion is formed by pouring the water phase into the agitated nitrocellulose phase. Specifically, a suitable emulsion contains in parts by weight:

| | |
|---|---|
| Nitrocellulose (½ sec.) | 22.8 |
| Dibutyl phthalate | 1.1 |
| Butyl alcohol | 12.3 |
| Amyl acetate | 19.5 |
| Methyl isobutyl ketone | 15.2 |
| Xylene | 23 |
| Sorbitan monolaurate polyoxyalkylene (Tween) | 6.1 |
| Water, parts | 40 |

To the emulsion is added 23.9 parts by weight of 200 mesh atomized aluminum powder which is dispersed primarily in the aqueous phase, and 16 parts by weight of dissolved and dispersed ammonium perchlorate.

The solids of the resulting coating composition contain about 37½ parts by weight of plasticized nitrocellulose, 37½ parts by weight of the aluminum powder, and 25 parts by weight of ammonium perchlorate. This composition has a viscosity of about 30° Brookfield at 68° F. with a #6 spindle at 100 r.p.m. and is readily applied to the impregnated web by the coating device illustrated in FIG. 2. As will be noted from FIG. 2, the excess of coating material applied by the applicator roll 23 of the first coater is bladed off at 27; the coating removed is returned to tank 25. Web passage through the nip 21 is suitably at a speed of 300 feet per minute, and the roll 22 carries the web through the nip and is itself rotated at substantially the indicated surface feet per minute speed. The web leaving the drier 28 carries approximately 33 pounds of coating solids per ream.

From the blade 27 and drier drum 28 the web is passed to the coating device 29 to be coated on its reverse side and drying then takes place on drum 36. At this point the product is composed of approximately 60% impregnated base sheet and 40% coating, total weight 167 pounds per ream.

The texture of the sheet is changed by the oxidant impregnant and the treatment from that resembling light blotting paper to that of a light paperboard. The coating treatment due to the presence of the aluminum which is worked into the surface of the impregnated fibers has a silvery-grey appearance.

The calender operation tends to further impress the coating into the web to such an extent that the aluminum tends to darken somewhat in color, the usual final product being steel-grey.

Calender stack 39 is simply a tier of hardened steel rolls under pressure which serve to densify the sheet. The web as passes to the calender 39 has a bulk density of about 0.92 and when it leaves the calender 39 is reduced by approximately 40–50% in thickness. The bulk density leaving the calender is approximately 1.70. In the instance under consideration the infrared lights 42 are not employed and the winding is in the form of superposed layers. Roll 43, which may be in excess of 160 inches wide when processed in the manner described, may be removed from the mandrel 41 and itself serve as a propellant charge. Exemplary of the dimension of such a charge is a roll diameter of 50 inches. The thickness of the web which forms the roll 43 being approximately 0.015 inch permits ready control of charge diameter size by simple unrolling.

The web which forms the roll 43 contains by weight approximately 15% by weight of cellulose, 15% by weight of plasticized nitrocellulose, 15% by weight of aluminum, and approximately 55% by weight of ammonium perchlorate. The theoretical shifting specific impulse figure has been computed as 255.3; shifting specific impulse is defined as the pounds of thrust generated per pound of propellant burned per second; it is calculated on the basis of equilibrium gas conditions at the nozzle exit with due regard to the effect of pressure and temperature gradient on the gas equilibrium and thus gives consideration to the changing molecular composition of a system of gases passing through an exhaust nozzle during combustion. The composition thus described is illustrated by point A on graph FIG. 11. Exemplary of dimensions of a roll charge producible as described are:

Length _____ 15 feet.
Diameter _____ 8 feet, 6 inches.
Cavity diameter _____ 2 feet.

*Example 2*

The procedure of Example 1 except as noted specifically, was followed. The basic weight of the web is 36 pounds (22 x 17 x 500 sheets) and the web is ⅕ of the weight of the propellant. Such a web impregnated with ammonium perchlorate as illustrated in FIG. 2 but using only one pass of the impregnating bath will, when dried, have a ratio of oxidant (ammonium perchlorate) to cellulose of about 2 to 1. The coating composition in this instance is a similar emulsion but containing as solids by weight approximately 50% nitrocellulose and plasticizer, 37½% aluminum powder (200 mesh) and approximately 12½% of ammonium perchlorate. The product of the operation in such instance contains by weight 20% cellulose, 20% plasticized nitrocellulose, 15% aluminum and 45% ammonium perchlorate, the computed shifting specific impulse being approximately 253. This composition is represented by point B on graph FIG. 11.

*Example 3*

The procedure in this example is generally as described in Example 1. The base sheet weight may suitably be intermediate that of Examples 1 and 2 and for this purpose a web having a basis weight of about 30 pounds is employed. The web, when twice passed at papermaking speeds through the oxidant bath, first with the saturated solution at 50° C. and the second pass at room temperature, and thereafter dried as indicated, contains approximately 74% by weight of ammonium perchlorate and 26% by weight of cellulose. The coating composition in this instance contains as solids 51.1% by weight of nitrocellulose and plasticizer, 41.6% of aluminum and approximately 7.3% of ammonium perchlorate. The resultant product contains by weight 16.6% of cellulose, 18.4% by weight of plasticized nitrocellulose, 15% by weight of aluminum, 50% by weight of ammonium perchlorate, and exhibits a specific impulse (shifting) of about 254. This composition approximates that represented by the letter C on graph FIG. 11.

*Example 4*

Substantially, the same specific impulse as achieved in Example 3 may be produced with the following composition:

A web having a basis weight of 25 pounds is subjected to the impregnating baths of ammonium perchlorate and, upon drying, has a content of approximately 29.2% cellulose and 70.8% ammonium perchlorate. Such web is then coated with an emulsion having as solids approximately 43.7% nitrocellulose, 37.5% aluminum and 18.8% ammonium perchlorate. The resultant product of the described operation has a content of about 17.5% cellulose by weight and an equivalent amount by weight of plasticized nitrocellulose, 15% by weight of aluminum and approximately 50% by weight of ammonium perchlorate.

*Example 5*

The following example illustrates the production of a charge having a specific impulse of 256 secs.:

A web having a basis weight of 16 pounds is, in the manner described in Example 1, passed through the oxidizing agent bath to provide, when dried, a product having an ammonium perchlorate content of about 74.5% by weight and 25.5% by weight of cellulose.

The coating composition in this instance is a relatively viscous solution having 31.2% of ¼ sec. nitrocellulose and plasticizer as a binder in acetone, 37.8% of aluminum, and 31.2% of ammonium perchlorate; such coating is applied to both sides of the web. The coated dried web in this instance contains by weight 14% of cellulose, 14% of plasticized nitrocellulose, 17% of aluminum, and 55% of ammonium perchlorate.

The larger rolled web may be formed into smaller propellant charges of desired size. As illustrated in FIG. 5, rerolling also permits the facile production of charges having other materials interlayered with the coated web. Such materials may be, for example, kraft paper to arrest momentarily the burning rate of the propellant as burning proceeds readily from the interior of the roll outwardly; other sheet materials may be interlayered to alter burning characteristics at a definite location in the roll radius. Referring first to FIG. 5, pinch rolls 55, 56 form a nip 57 into which the coated web 58 is passed from roll 59. A roll of kraft paper sheet designated 60 is fed to the nip 61 formed by wind-up roll 62 and support rolls 63, the winding being effected suitably on a collapsible mandrel 64. The web and kraft paper are wound together to provide a composite roll. The kraft paper in the usual application will not be applied continuously throughout the roll diameter but will be interspersed annularly radially. As indicated by the dotted line in FIG. 5, one layer of material may be fed to the web as it is rewound. Thus the web 58 passing through the nip of rolls 62, 63 in the direction indicated by the arrow is wound as already described, and at selected intervals other sheet such as a less combustible plastic or metal from a source 65 is fed to the partially wound-up roll to provide over a radial length of the finished roll for a short distance a plurality of such other layers 66. A roll 62 embodying this feature is illustrated in FIG. 13, the roll cavity being designated at 67.

FIG. 6 in enlarged and exaggerated view illustrates the web 1 impregnated and coated, with the coated layers 68 in superposed relation, as the product normally appears. While reference has been made to paper machines of 160 inch width, it is to be understood that machines of much greater width are commonly employed in the paper industry for particular purposes. Accordingly, it is contemplated that the product illustrated generally in FIG. 6 may have a width of over 300 inches. With a machine width of 180 inches, a 20 ton charge is producible in a few hours at a machine speed of 300 feet per minute.

Referring now to FIG. 7, the propellant charges of invention are particularly adapted for multiple arrangement. For this purpose the charges 70, 71, as illustrated in FIG. 7, may be placed in substantial end-to-end abutment. Obviously, a plurality of charges may be arranged in end-to-end abutment and the length-diameter ratio for a given perforation may be chosen to achieve desired characteristics for a particular end use of the rocket propellant. To confine the burning internally, such propellants are suitably inhibited on all nonburning areas with silicone grease, cellulose acetate, or other suitable burning inhibitors designated at 72.

Various configurations of propellant grains may be formed utilizing the coated web described. Such are illustrated in FIGS. 8-10 inclusive. Formation of these charges as well as other configurations of the star, multifin, and the like, is facilitated by the machinability of the propellant described.

In FIG. 8 the numeral 74 designates a propellant of the rod and tube type formed from a smaller roll 75 and a larger diameter roll 76 provided with perforation 77 into which roll 75 extends. While not shown in FIG. 8, roll 75 is coextensive with roll 76 axially; also, roll 75 and roll 76 have substantially the same radial dimension providing equal burning thicknesses. The combustion and pressure generation of such charge proceeds in accordance generally with the graph of FIG. 8a, burning being initiated and continued in the perforation space 77.

A tubular type charge is illustrated in FIG. 9 at 79. Such charge is, of course, readily formed to shape in the practice of the invention and includes generally radial slits 80, 81. Combustion and pressure generation proceed as indicated in FIG. 9a. The radial slits permit burning to proceed axially in the charge as well as radially.

The charge of FIG. 10 designated by the numeral 82 is a cylindrical propellant having a perforation 83 which provides the thrust variation with burning time designated in FIG. 10a.

From the foregoing it will be appreciated that the propellant of the invention lends itself readily to shaping into a variety of forms to permit attainment of a wide variation in propellant characteristics.

The web 1, when impregnated, is subject to some loss in flexibility but nevertheless may be bent relatively sharply upon itself without permanent distortion. It is therefore quite resistant to cracking and rupture in the impregnated state. The subsequent coating does not materially alter the flexibility of the sheet; densification appears to aid flexibility and the densified material is less subject to cracking than the impregnated web and, in fact, exhibits very nearly the same flexibility characteristics as the original web despite the heavy loading of the sheet.

FIGS. 11 and 12 more broadly illustrate ranges of compositions operable as propellants for a variety of purposes. In FIGS. 11 and 12 the line designated "stoichiometric" indicates compositions in which the burning action is based upon stoichiometric formulations, that is, formulations having sufficient oxidant (ammonium perchlorate) present to provide for complete combustion of the components of the propellant. The "omox" line, indicating omox burning, is representative of the condition wherein sufficient oxidizer is present to burn carbon to carbon monoxide, metal to metal oxide, and the hydrogen of the constituents is unburned. The area between the lines indicates desirable compositions for the practice of the invention, the compositions more closely approaching the omox line being preferable.

Reference has already been made in the detailed examples to a number of compositions illustrated by FIG. 11. The following table defines compositions and their pertinent characteristics considered to be particularly suitable for relatively large propellant charges, for example, charges having a gross weight of 20 tons or more.

TABLE 1.—ESTIMATED SPECIFIC IMPULSES FOR VARIOUS CELLULOSE-NITROCELLULOSE-Al-FUEL FORMULATIONS CONTAINING $NH_4ClO_4$ AS OXIDIZER

| No. | Formulation (percent) | | | | Chamber ($P_c$=68 atm.), $T_c$, °K. | Equilibrium ($P_e$=1 atm.) | | | | | |
|---|---|---|---|---|---|---|---|---|---|---|---|
| | | | | | | Frozen | | | Shifting | | |
| | Cellulose | Nitrocellulose | Al | $NH_4ClO_4$ | | M.W., g. | $T_e$, °K. | Isp | M.W., g. | $T_e$, °K. | Isp |
| 1 | 12.5 | 12.5 | 20.0 | 55.0 | 3,829 | 33.87 | 2,319 | 250.5 | 36.23 | 2,600 | 257.5 |
| 2 | 15.0 | 15.0 | 15.0 | 55.0 | 3,593 | 31.80 | 2,059 | 249.4 | 33.44 | 2,319 | 255.3 |
| 3 | 20.0 | 20.0 | 15.0 | 45.0 | 3,406 | 30.02 | 1,895 | 249.3 | 30.78 | 2,090 | 253.1 |
| 10 | 23.0 | | | 77.0 | 2,861 | 27.58 | 1,357 | 231.8 | 28.36 | 1,582 | 240.0 |

$P_c$ is chamber pressure; $P_e$ is exhaust pressure; M.W. is molecular weight; $T_c$ is chamber temperature; $T_e$ is exhaust temperature; and Isp is estimated specific impulse.

It is to be noted from the foregoing that the substantially continuous cellulose carrier matrix may constitute between about 1/8 to 1/3 by weight of the propellant while yet achieving very high specific impulse characteristics. Further, the specific impulse increases materially with the aluminum proportion, such being provided readily on the web by the novel employment of the coating process. Additionally, the coated aluminum is intimately bonded with the web and its impregnating oxidant providing for uniform combustion.

The nitrocellulose binder, while not of itself an essential ingredient to the procedure, is highly desirable since it performs the function of a binder while yet being combustible and supplying its own oxidant. A guncotton grade may be employed to enhance specific impulse; also nitroglycerin which could function as a plasticizer in the coating, may be included to enhance further specific impulse.

The charges which do not include aluminum are useful as propellants where a lower specific impulse is satisfactory. The very small crystals of oxidizing agent producible in the interstices of the cellulosic web by the speed of drying provide intimate burning, not only in the large coated charges, but also in those merely in which the web itself serves as fuel (FIG. 12).

It will be understood that, depending upon the end result desired in the product, various materials may be substituted for the specific webs described as well as for the oxidizing and coating constituents. If the substituted materials are soluble, they may be incorporated in the base sheet through the medium of the saturant bath; if insoluble, the material may be readily introduced as a coating constituent.

Saturating base sheets of cotton fibers such as first and second cut cotton linters, esparto fibers which provide a relatively high void volume per pound of pulp, and mixtures of the cellulosic wood fibers with cotton fibers, and others such as the esparto, are useful in web formation. Cotton linters are desirable in providing low bulk density webs. Further reductions in bulk density of the wood fibers, cotton linters and esparto, for example, may be realized by mercerizing the fibers prior to forming the web making slurry.

From the foregoing description it is apparent that the propellant described may be readily installed in conventional rocket casings. For example, the customary metallic casing may be lined with a polymerizable elastomeric material, the selected cylindrical charge inserted with its periphery in contact with the rubber, and the charge may be cured and bonded to the rubber and thereby to the casing. Such curing may be achieved at temperatures of 175–200° F.

Charges may be stacked within a single casing and bonded; alternatively, separate segmented filled casings may be employed and then stacked. Such casings may be readily clustered to provide charges of tremendous power and weight.

Further, while conventional equipment in the paper industry commonly is capable of producing rolls having a weight in the thousands of pounds, and widths of several hundreds of inches, such equipment may be modified readily to produce larger unit charges should such be desired. This may be accomplished by relatively simple mechanical changes to provide adequate handling space for the charges.

Accordingly, it is apparent that the invention by reason of the relatively high speed of charge formation (papermaking speeds) and the size of the charges which are readily handled contribute materially to the economical production of solid rocket propellants.

It is to be noted that paper machines commonly are operable over a wide speed range—to over 2000 feet per minute—thus providing wide latitude in the production process. Additionally, component parts of the machine, such as driers, may suitably be selected in number and as to temperature of operation as to effect optimum speed and economy. Usually such drying temperatures will range between about 212° and 250° F.

Further routine operations common to the papermaking procedures, such as edge trimming and the like, may be readily practiced in the procedure of the invention to secure a most uniform product.

It will be understood that this invention is susceptible to modification in order to adapt to different usages and conditions and, accordingly, it is desired to comprehend such modifications within the invention as may fall within the scope of the appended claims.

What is claimed is:

1. A substantially continuous process of producing a solid propellant which comprises the steps of impregnating a traveling length of a cellulosic absorbent paper web with an aqueous solution of an inorganic water soluble oxidant which penetrates the interstices of the web, drying the web with the impregnated oxidant therein in the form of minute crystals and present to the extent by weight of at least twice the web weight; coating the web with the oxidant in the dried condition on the web with a fuel including finely divided metal particles and a combustible binder to adhere the fuel to the said oxidant-impregnated web, drying the traveling fuel-carrying web, densifying the traveling web, and continuously passing said web longitudinally while winding said web into a structure useful as a solid propellant, said cellulosic paper web constituting between about ⅛ to ¼ by weight of the densified structure and serving as a carrier-matrix for the oxidant impregnant and fuel coating.

2. The process of producing a solid propellant which comprises the steps of impregnating a substantially continuous traveling length of a cellulosic paper web having a basis weight of at least 16 pounds per ream (17″ x 22″ x 500 sheets) with an aqueous solution of water soluble inorganic oxidant which penetrates the interstices of the web drying the impregnated web as it travels to deposit the oxidant impregnant in the interstices of the web in the form of minute crystals to the extent of at least twice the web weight, coating the dried web with a fuel including a finely divided metallic powder and a heat softenable combustible binder which latter adheres the metallic powder fuel to the web and to itself, drying the traveling web with the fuel thereon, said web constituting 12.5% to 20% by weight of the dried coated web densifying the traveling web by subjecting the web to a rolling pressure sufficient to materially decrease the web thickness, winding the densified web into a compact cylinder on a mandrel removable from the cylinder, softening the coating on said web by heating the web as the web is being wound to securely laminate adjacent layers together in the compact cylinder, and subsequently removing said mandrel from the wound cylinder to provide the internal cavity of the propellant.

3. The process of producing a solid propellant which comprises the steps of impregnating a substantially continuous length of a cellulosic absorbent paper web having a basis weight of about 16 to 45 pounds per ream (22″ x 17″ x 500 sheets) with an aqueous solution of a water soluble inorganic oxidant which penetrates the interstices of the web, impregnating the web to the extent that the oxidant content is at least twice the web weight and more than sufficient to provide for the combustion of the web with a minimum of ash, drying the web to provide minute crystals of the oxidant in intimate engagement with the web, coating the impregnated web in the dried condition of the web with a fuel including a finely divided metal and a combustible binder, proportioning the fuel to the web and oxidant such that the quantity of oxidant is at least sufficient to provide for omox combustion of the web and fuel and which omox combustion is a condition of burning of carbon to carbon monoxide, metal to metal oxide with hydrogen present unburned, densifying the coated web, and drying and forming the coated web into a compact wound structure.

4. In a continuous process for producing solid propellants, the steps of impregnating a substantially continuous length of a traveling cellulosic absorbent paper web having a basis weight in the range of 16 to 45 pounds per ream (17″ x 22″ x 500 sheets) with ammonium perchlorate to the extent that in the dried impregnated condition of the web the ammonium perchlorate weight is between about two to four times that of the web, drying the traveling impregnated web to deposit minute crystals of ammonium perchlorate in the interstices of the web, coating the traveling dried and impregnated web with a composition containing aluminum metal as fuel, nitrocellulose as binder and additional ammonium perchlorate as oxidant, coating the web to the extent that the dried coated web has a weight such that the coating weight is approximately 40% of the total dried weight, drying the coated traveling web, densifying the dried coated web under a rolling pressure to reduce the coated web to 40 to 50% of its thickness and to increase coated web density, winding the web into compact cylindrical form on a mandrel removable from the wound web, and subsequently removing the mandrel from the wound web.

5. The process of producing a solid propellant which comprises the steps of impregnating a substantially continuous length of a traveling cellulosic absorbent paper web having a basis weight in the range of 16 to 45 pounds per ream (17″ x 22″ x 500 sheets) with ammonium perchlorate by passing the web at papermaking speed through a saturated aqueous solution of the ammonium perchlorate maintained at a temperature such that the weight pickup of the ammonium perchlorate in the dried condition of the web is at least twice the web weight, squeezing excess saturant from the traveling web, drying the traveling impregnated web at between about 212° and 250° F. to deposit ammonium perchlorate crystals in the interstices of the web, coating the impregnated web with an emulsion containing finely divided aluminum metal and nitrocellulose, coating each side of the said web as it travels, drying the coated traveling web at temperatures between about 212° and 250° F., densifying the dried, coated traveling web under a rolling pressure to the extent that the web thickness is reduced by 40 to 50% of its thickness and web density increased, and winding the densified coated and impregnated cellulosic web into compact cylindrical form.

6. A solid propellant comprising a combustible carrier matrix in the form of an absorbent cellulosic paper web having a basis weight in the range of 16 to 36 pounds per ream (17" x 22" x 500 sheets), an impregnant of ammonium perchlorate in the interstices of said web and in the form of minute crystals, a coating on each side of said web comprising finely divided aluminum metal and nitrocellulose, said web being in the form of a compact cylinder having an axial cavity, and the proportion by weight of said constituents being such that the web constitutes between about 12.5% to 20% of the propellant, the ammonium perchlorate constitutes 45% to 55%, the finely divided aluminum metal constitutes between about 15% and 20%, and the nitrocellulose constitutes between about 12.5% to 20%, said carrier matrix with the impregnant and coating thereon having the form of a compact layered structure.

7. A solid propellant comprising a substantially continuous combustible absorbent cellulosic paper web having a weight in the range of 16 to 45 pounds per ream (17" x 22" x 500 sheets) and wound in the form of a cylinder, a coating on each side of the said web bonded to the web and containing finely divided metallic particles and a combustible binder, an oxidant impregnant in the interstices of the web in the form of minute crystals intimately engaged with and carried by the web and present to the extent of at least twice the weight of the web, said web constituting between about 1/8 and 1/5 of the weight of the propellant, said metallic particles being pressed into the surface of the impregnated web and intimately retained on the web.

8. A rocket propellant as claimed in claim 7 and in which windings of the coated web are interlayered with at least one other combustible sheet material capable of arresting the burning rate of the rocket propellant.

References Cited by the Examiner
UNITED STATES PATENTS

| | | | |
|---|---|---|---|
| 777,125 | 12/04 | Muller-Jacobs | 149—12 |
| 2,991,168 | 7/61 | Nadel | 149—100 |

CARL D. QUARFORTH, *Primary Examiner.*

ROGER L. CAMPBELL, LEON D. ROSDOL,
*Examiners.*